United States Patent Office 3,511,990
Patented May 12, 1970

3,511,990
RADIOGRAPHIC FILM CASSETTE HAVING A RESILIENT FILM RELEASE STRIP THEREIN
Robert M. Hauss, Rochester, N.Y., assignor to Eastman Kodak Company, Rochester, N.Y., a corporation of New Jersey
Filed June 26, 1967, Ser. No. 648,586
Int. Cl. G03b 41/16
U.S. Cl. 250—68      7 Claims

ABSTRACT OF THE DISCLOSURE

An X-ray film cassette having a pair of thickened elastomeric members along two opposite edges of the film which act, upon opening the cassette, to assure that the film is freed from the intensifying screen.

BACKGROUND OF THE INVENTION

The present invention is directed to a new and improved film package and more particularly to a cassette containing an X-ray film in a manner suitable for exposure.

Much development has been done in the art of packaging film for exposure purposes. Medical X-ray film has presented unique packaging requirements in that, to be most effective, the film must be overlaid by intensifying screens. The intensifying screens fluoresce under X-ray bombardment and thus release light energy which exposes the adjacent film. However, if the screens are not in uniform contact with the film, the fluorescing point of the screen will cause an undesirable area of confusion in the exposure on the film. Since the intensifying screens account for as much as 95% of the latent image produced in X-ray films, their behavior and relationship with the film must be accurately controlled. Thus, one requirement of a cassette is that the X-ray film be compressed between the intensifying screens in a manner developing substantially uniform yet low pressure across the entire area of the film. Additionally, it is most practicable to have cassettes which are of minimum weight for convenience of handling, and minimum X-ray absorption through the front of the cassette where the X-rays enter to expose the film. A typical X-ray cassette uses a pair of hinged thin flat plates supporting flat soft pads therebetween with intensifying screens on their surfaces.

Heretofore, the various operations of handling such cassettes, e.g., unlocking, opening, loading and unloading of the cassette, have been performed manually. However, apparatus has been developed wherein the unlocking and opening of the cassette and the loading and unloading of the film sheet is performed automatically. It has been found that with such automatic handling the individual sheets of film material may not always be dispensed readily from the opened cassette because the film sheet tends to adhere to one of the intensifying screens. This tendency of the sheet of film material to adhere to certain parts of the cassette can be caused by the pressure of the closed cassette on the film sheet, by the presence of moisture within the cassette, by electrostatic charges generated by friction between various parts of the cassette and the film material, or by air pressure or air suction as the cassette is opened or closed. As a result, in automatic handling equipment relying upon gravity to unload the film sheet from the cassette, such adherence of the film to the intensifying screen may substantially interfere with, if not prohibit, the high speed handling of X-ray cassettes necessary in many applications.

X-ray film containing cassettes are known wherein pins or levers are arranged to engage an edge or surface of the film sheet as the cassette is opened to disengage the film from the intensifying screens so that it can be readily removed. However, such arrangements have been less than completely satisfactory since the ejecting members employed can damage either the surface or the edge of the film sheet with which they come into contact. Damage can be in the form of scratches on the surface of the film which may obscure the image formed thereon, or even cause the film to appear to register a false image. Damage to the edge of the film may be such that it can not be satisfactorily fed through automatic handling apparatus.

It is thus apparent that it would be extremely desirable to provide means within an X-ray film-containing cassette of the type described above which is adapted to positively and yet gently urge the film sheet away from any surface to which it may adhere when the cassette is opened, thereby facilitating the removal of the film sheet from the cassette.

SUMMARY OF THE INVENTION

Accordingly, the present invention provides a film package or cassette comprising a pair of hingedly connected plate members having, when in operative position, a pair of opposed inner faces. A layer of resilient material is disposed on at least one of the opposed faces and a strip of resilient or elastomeric material, having a greater thickness than the layer, is provided along at least a portion of one edge of the layer of resilient material arranged so that, upon opening of the cassette, the film contained therein is released from the layer of resilient material.

Moreover, the present invention provides a cassette having a layer of resilient material disposed on both of the opposed inner faces with an X-ray intensifying screen extending over substantially the entire area of at least one of said layers.

Furthermore, the present invention provides a radiographic film cassette comprising a pair of substantially rectangular frame members each surrounding a plate member. The frame and plate assemblies are hingedly connected along one edge to mate in light-tight relationship, in the closed operative position, and have a pair of opposed inner faces. A layer of resilient material, which is substantially coextensive with the plate member, is disposed on each of the opposed inner faces. A strip of resilient material, having a greater thickness than the layer of resilient material, is disposed along the edge of each layer opposite the edge along the hinged edge of the frame members with the strip of resilient material extending along the edges of the layer adjacent the opposite edge. The strip terminates along the adjacent edges between the hinge edge and the opposite edge of the layer. The strips are arranged to be compressed to the same thickness as the layers of resilient material when the frame members are in closed operative position. An intensifying screen is attached to and is substantially coextensive with each of the layers and the associated strips whereby, upon opening the cassette, a sheet of radiographic film normally held between the intensifying screens is released therefrom by the expansion of the strips acting on the edges of the film.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiments of the present invention are illustrated and described.

DESCRIPTION OF THE PREFERRED EMBODIMENT

Figure 1:
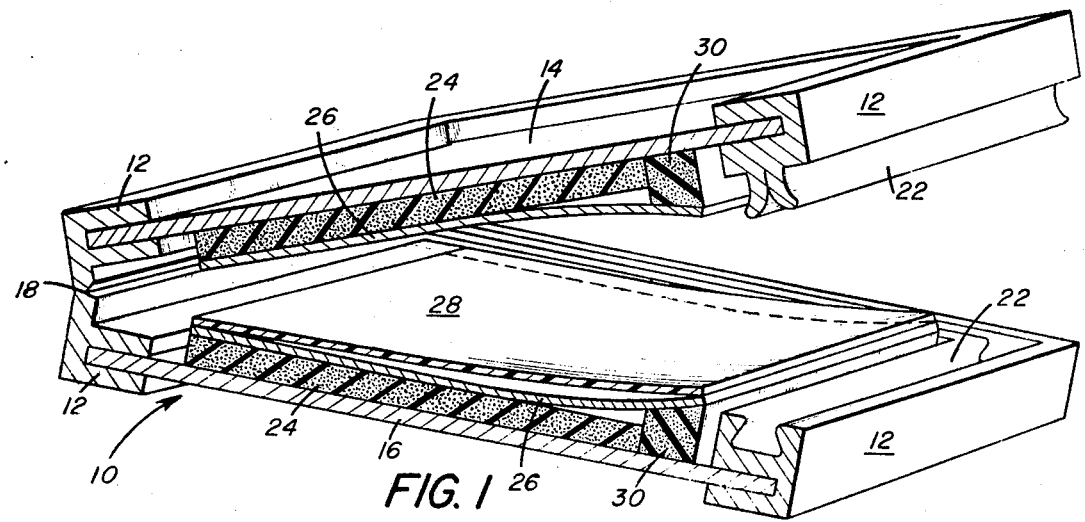
FIG. 1 is a perspective section of a partially open cassette incorporating a specific embodiment of the present invention.

A radiographic film cassette 10 is illustrated in FIG. 1 and comprises generally a pair of substantially rectangular frame members 12 attached to and surrounding plate members 14 and 16 which have, when the cassette is in closed operative position, a pair of opposed faces. The rectangular frame members 12 may be molded of plastic or they may be fabricated of any other suitable material well known in the art. The plate members 14 and 16, which may be molded integrally with the frame members, are formed of a material, such as a thin sheet of plastic or aluminum, which is opaque to visible light but which is substantially transparent to X-rays. The frame members 12 are provided with a light-tight hinge 18 extending along the rear edge thereof. In the present embodiment, the hinge is shown formed integrally with the frame members 12. The frame members are further provided with a tongue and groove arrangement 20 along the edges adjacent the hinge 18 which are arranged to mate when the cassette is in the closed operative position illustrated in FIGS. 2 and 3 to form a light-tight closure along the sides of the cassette and to provide the necessary rigidity of the cassette in the closed portion. The tongue and groove assembly 22 along the front edge of the cassette, opposite the hinge 18, may be modified as illustrated in FIGS. 1 and 3 to form both a light-tight seal and a latch.

A layer or pad of resilient or elastomeric material 24, such as felt, cork, or foamed plastic, is fastened to, and extends substantially over, the entire extent of the inner opposing face of each of plate members 14 and 16. These layers or pads are preferably formed of a foamed plastic, and act as a backing for the intensifying screens 26 which are fastened thereto. These pads provide a substantially uniform yet low pressure on the sheet of film 28 which is disposed between the intensifying screens when the cassette is closed, in a manner well known in the art.

The layers of resilient material 24 are surrounded on the front and side edges with film release strips 30, 32 and 34, also formed of a resilient or elastomeric material, such as foamed plastic, which have a greater thickness than the pads 24. The X-ray intensifying screens 26 also extend substantially over the surface of the release strips 30, 32 and 34 and are connected thereto, and to the pads 24, in any suitable manner, such as by strips of double-faced tape (not shown). The intensifying screens may be made of any material well known in the art including calcium tungstate, fluoride, lead or combinations of these materials. The strip 30 may extend across the entire front edge of the pad 24, opposite the rear, hinged edge of the frame members. The strips 32 and 34 that extend rearwardly from the front edge along the side edges of the pad 24 toward the hinged edge terminate between the rear, hinged edge and the front edge of the pad, as shown at 36 in FIG. 3.

Figure 2:
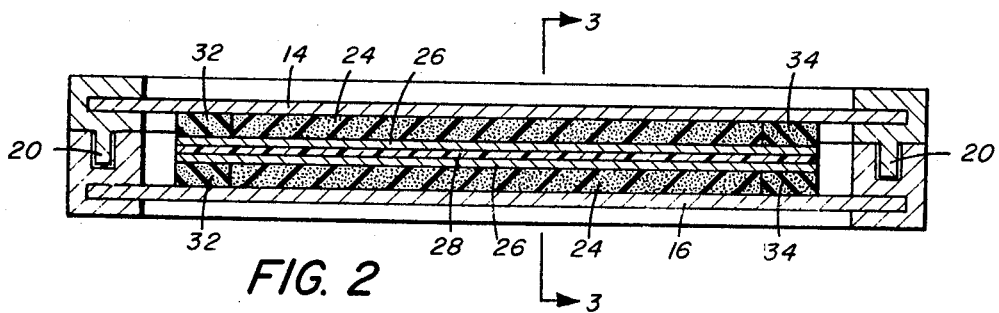
FIG. 2 is a section taken across a closed cassette.
Figure 3:
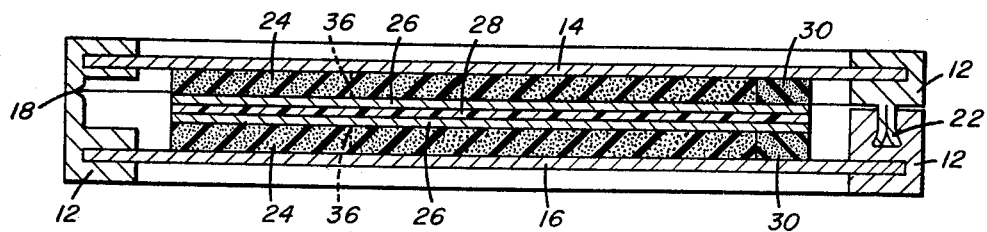
FIG. 3 is a sectional view of a cassette taken along line 3—3 of FIG. 2.

The film 28 is placed in the open cassette as illustrated in FIG. 1 and the cassette is closed as illustrated in FIGS. 2 and 3, causing the film to be held securely in place between the intensifying screens 26. As the cassette is closed, both layers of resilient material 24 and the strips 30, 32 and 34 are compressed to substantially the same thickness, providing a substantially uniform low pressure between the film and the intensifying screens.

After the film has been exposed, the cassette is opened and the side strips 32 and 34 expand to a greater thickness than the pads 24, raising the edges of the film 28 above the general level of the pad. Since the film is relatively stiff, raising the edges thereof releases it from adherence to the intensifying screen 26 by admitting air between the intensifying screen and the surface of the film. The layer 30 along the front of the cassette may also assist in releasing the film from the intensifying screen as well as directing the film over the front edge of the cassette frame so that the film is not obstructed thereby.

It will be noted that the side strips 32 and 34 do not extend along the entire depth of the cassette thereby reducing the angle to which the cassette must be opened to permit the removal of the film. Furthermore, with this construction, there is less likelihood of displacing the film from the hinged edge of the cassette as it is closed after loading.

Accordingly, it will be seen that the present invention provides a relatively simple film cassette arrangement whereby release of the film from the intensifying screen is assured without the possibility of damaging the film by the releasing action.

It will be appreciated that while the preferred embodiment of the present invention is illustrated with release strips associated with both the top and bottom of the cassette, it is possible that strips may be advantageously used on only the top or the bottom of the cassette. Furthermore, while the preferred embodiment is illustrated having a release strip extending along three sides of the pads of resilient material, it would be possible to utilize only one or two release strips and still obtain film release. It is also possible that the release strip along the edge of the resilient pad may be replaced or supplemented by an area of increased thickness within resilient pad area.

The invention has been described in detail with particular reference to preferred embodiments thereof, but it will be understood that variations and modifications can be effected within the spirit and scope of the invention as described hereinabove and as defined in the appended claims.

I claim:

1. A film cassette arranged to hold a sheet of film having predetermined dimensions, said cassette comprising a pair of associated plate members having, when in closed operative position, a pair of opposed faces, a layer of resilient material disposed on at least one of said opposed faces, said layer of resilient material having at least one dimension less than one of said predetermined dimensions, and a film release strip of resilient material extending along the layer of resilient material at least partially within said predetermined dimensions, said film release strip having a greater thickness than said layer of resilient material and cooperating therewith to extend above said layer when said cassette is opened.

2. The invention according to claim 1 wherein said film release strip extends along at least a portion of one edge of said layer of resilient material.

3. The invention according to claim 1 wherein said plate members are hingedly connected along one edge to form the cassette.

4. The invention according to claim 1 wherein a layer of resilient material is disposed on both of said opposed faces and an intensifying screen extends over substantially the entire area of at least one of said layers.

5. The invention according to claim 3 wherein film release strips of resilient material having a greater thickness than said layer of resilient material are provided along the three edges of said layer away from the hinged connection of said plate members.

6. The invention according to claim 5 wherein the film release strips extend along the sides of said layer from the front edge only a portion of the distance to the hinged connection of said plate members.

7. A radiographic film cassette arranged to hold a sheet of film having predetermined length and width dimensions, said cassette comprising a pair of substantially rectangular frame members each surrounding a plate member, said frame and plate assemblies being hingedly connected along the rear edge of said cassette and arranged, in closed operative position, to mate in light-tight relationship with a pair of opposed faces, a layer of resilient material disposed on each of said opposed faces and substantially coextensive with each plate member, said layers of resilient material having length and width dimensions less than said predetermined dimensions, a film release strip of resilient material disposed along the front edge of each layer of resilient material within said predetermined dimensions, said strip of resilient material extending along the side edges of said layer rearwardly from the front edge within said predetermined dimensions, said side strips terminating between the rear edge and the front of said layer, said film release strips having a greater thickness than said layer of resilient material and arranged to be compressed to the same thickness as said layers of resilient material when said frame members are in closed operative position, and an intensifying screen attached to and substantially coextensive with each of said layers and the associated film release strips whereby upon opening said cassette a sheet of radiographic film normally held between said intensifying screens is released therefrom by the expansion of said strips acting on the edges of the film.

References Cited

UNITED STATES PATENTS 3,135,864  1/1964  Sano _____ 250—68

FOREIGN PATENTS 350,784  3/1922  Germany.

RALPH G. NILSON, Primary Examiner

A. L. BIRCH, Assistant Examiner

U.S. Cl. X.R.

206—62